United States Patent [19]
Rolnik et al.

[11] Patent Number: 5,801,707
[45] Date of Patent: Sep. 1, 1998

[54] METHOD AND APPARATUS FOR DISPLAYING HIERARCHICAL DATA ASSOCIATED WITH COMPONENTS OF A SYSTEM

[75] Inventors: Robert C. Rolnik, Southlake, Tex.; Walter Frederick Lundby, Wheaton, Ill.

[73] Assignee: Motorola, Inc., Schaumburg, Ill.

[21] Appl. No.: 684,599

[22] Filed: Jul. 19, 1996

[51] Int. Cl.$^6$ ............................................. G06F 13/00
[52] U.S. Cl. ............................................. 345/429
[58] Field of Search ........................ 395/329, 330, 395/333, 331, 118, 355, 356, 357

[56] References Cited

U.S. PATENT DOCUMENTS

| | | | |
|---|---|---|---|
| 5,265,241 | 11/1993 | Arnold et al. | 395/182.02 |
| 5,295,243 | 3/1994 | Robertson et al. | 395/355 X |
| 5,319,747 | 6/1994 | Gerrissen et al. | 395/329 |
| 5,452,415 | 9/1995 | Hotka | 395/336 X |
| 5,483,631 | 1/1996 | Nagai et al. | 395/329 |
| 5,553,226 | 9/1996 | Kiuchi et al. | 395/356 |

*Primary Examiner*—Phu K. Nguyen
*Assistant Examiner*—Cliff N. Vo

[57] ABSTRACT

A method of displaying hierarchical data. The method includes the steps of: retrieving hierarchical network data and displaying the hierarchical network data using a perspective three dimensional view. The hierarchical data includes a plurality of data elements. Each data element is associated with a network device. An apparatus for displaying hierarchical data is provided. The apparatus comprises a display device, a memory device storing the hierarchical data, and a processor responsive to the memory. The processor includes a graphical display module that displays the hierarchical network data using a perspective three dimensional view. The hierarchical data includes a plurality of data elements where each data element is associated with a network device;

15 Claims, 4 Drawing Sheets

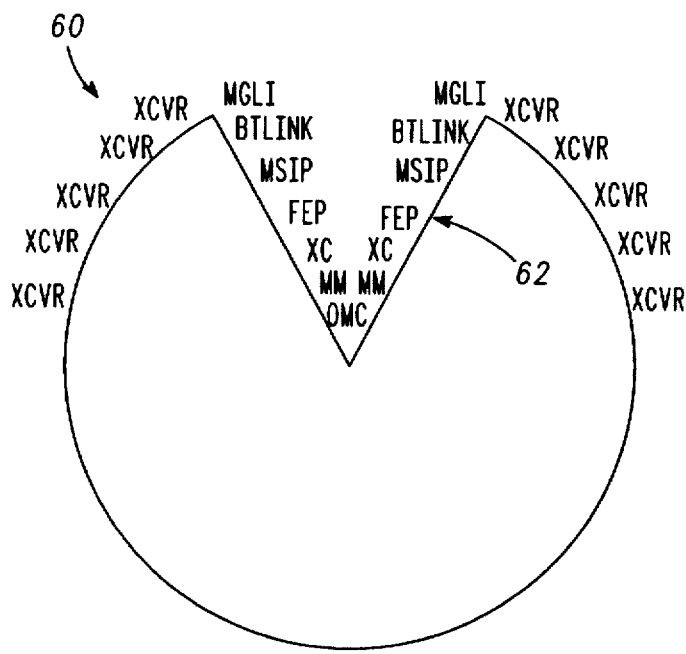

FIG.4

EXAMPLE OBJECT REPRESENTING A DATA
ELEMENT PRESENTED IN THE DISPLAY

| DEVICE TYPE | ID1 | ID2 | ID3 | ID4 | ID5 | PLATFORM | TELECOM STATUS |

HIERARCHICAL KEY      VALUE

ABSTRACT CLASS LOGICAL DEVICE
{
    RC   INT   DEVTYPE;   // THE DEVICE TYPE
    RC   INT   ID1;   // HIERARCHICY INFORMATION
    RC   INT   ID2;   // HIERARCHICY INFORMATION
    RC   INT   ID3;   // HIERARCHICY INFORMATION
    RC   INT   ID4;   // HIERARCHICY INFORMATION
    RC   INT   ID5;   // HIERARCHICY INFORMATION
    RC   INT   PLATFORM;   // TELECOM PLATFORM
    RW   INT   TELSTATUS;   // TELCOM STATUS

// OPERATIONS
    CONTROLLER Status Update (IN INT aNewTelphonyStatus);
    CONTROLLER StatusReport(out int CuTelphonyStatus);
};

METHOD AND APPARATUS FOR DISPLAYING HIERARCHICAL DATA ASSOCIATED WITH COMPONENTS OF A SYSTEM

FIELD OF THE INVENTION

This invention relates generally to complex systems, and more particularly to displaying hierarchical data associated with components of such systems.

BACKGROUND OF THE INVENTION

Complex systems with many components, such as cellular systems, generally require a high degree of maintenance. In order to manage the maintenance of each of the components, an operations center with a display representing various status indicators of the components is usually provided. Conventional systems typically generate reports such as alarm or traffic reports to provide system operators information regarding the operation of the system. Although these reports provide valuable information regarding specific aspects of the system, they fail to adequately provide an overall view of the system. More recently, improved display devices and operations centers use graphical user interfaces. Such graphical user interfaces typically display two-dimensional geographical information, such as a cell site view for a cellular communication system. However, due to the increased complexity of modern communication systems, there is still a need to display a high level view of the entire system. Such a high level view would allow trouble spots to be more quickly detected and acted upon.

Accordingly, there is a need for an improved method and apparatus for displaying data associated with components of a complex system.

SUMMARY OF THE INVENTION

In order to address this need, the present invention provides a method of displaying hierarchical data. The method includes the steps of retrieving hierarchical network data and displaying the hierarchical network data using a perspective three dimensional view. The hierarchical data includes a plurality of data elements where each data element is associated with a network device.

In accordance with another aspect of the invention, an apparatus for displaying hierarchical data is provided. The apparatus comprises a display device, a memory device storing the hierarchical data, and a processor responsive to the memory. The processor includes a graphical display module that displays the hierarchical network data using a perspective three dimensional view. The hierarchical data includes a plurality of data elements where each data element is associated with a network device.

The invention itself, together with its intended advantages will best be understood by reference to the following detailed description, taken in conjunction with the accompanying drawings.

BRIEF DESCRIPTION OF THE DRAWINGS

FIG. 3 and FIG. 4 are diagrams of an object displayed by the display device of FIG. 2.

FIG. 5 is a diagram of a hierarchical data element definition used by the objects in FIGS. 3 and 4.

DETAILED DESCRIPTION OF THE PREFERRED EMBODIMENTS

Figure 1:
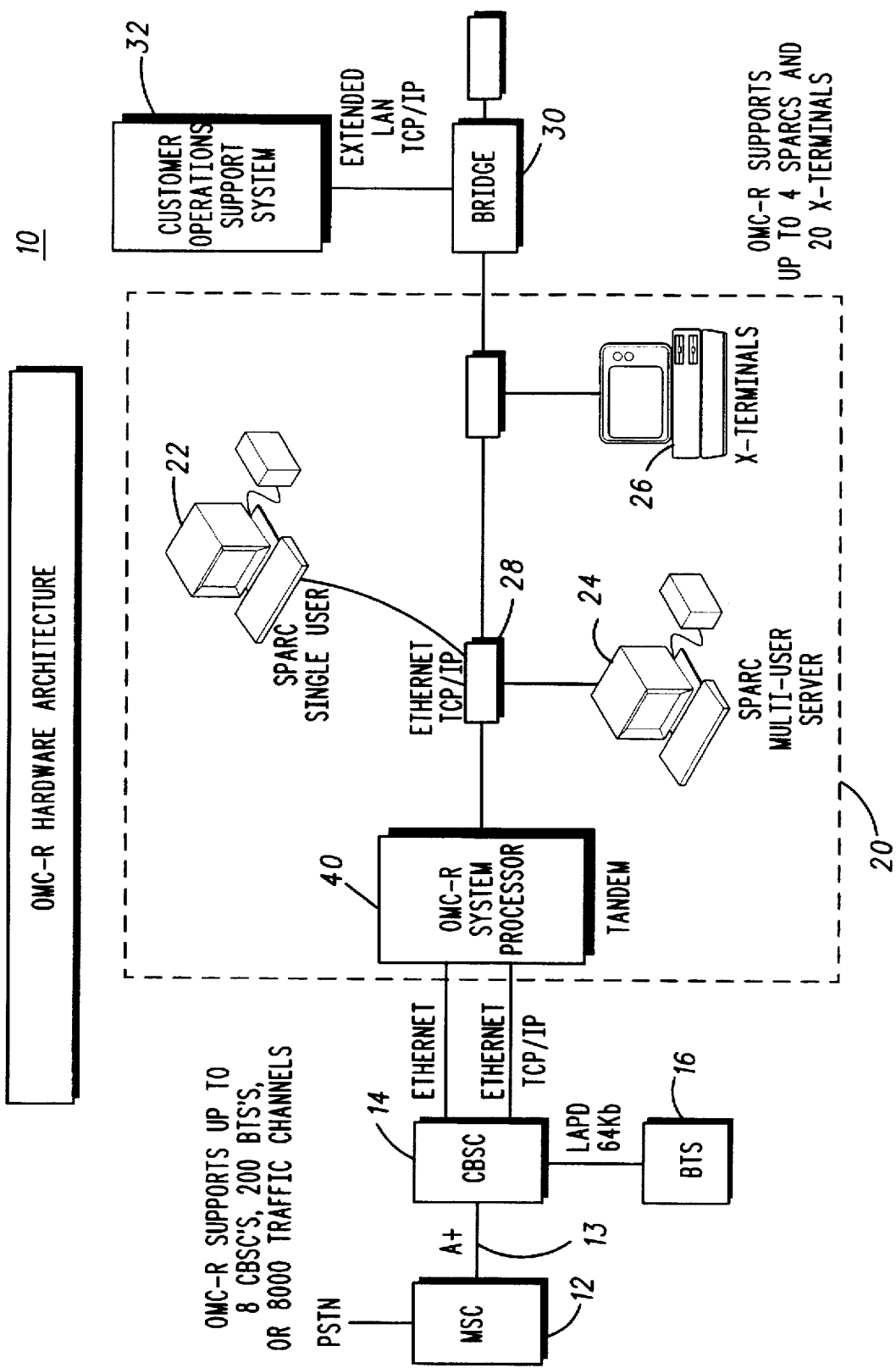
FIG. 1 is a block diagram depicting a cellular system that may use an embodiment of the present invention.

Referring to FIG. 1, a communication system 10 including a plurality of components is illustrated. Communication system 10 is a cellular communication system including a mobile switching center (MSC) 12, a base station controller (CBSC) 14, an operation maintenance center (OMC) 20, an operation support center 32, and a plurality of base transceiver stations (BTS) 16. Each of the plurality of base transceiver stations 16 is connected to the CBSC 14 via a data interface known to those of ordinary skill in the art. Similarly the MSC 12 is coupled to the CBSC 14 via a conventional cellular interface 13, such as the A plus interface. The CBSC 14 is connected to the OMC 20 via a data connection such as a TCP/IP connection. The OMC 20 is connected to the operation support system 32 via bridge 30 and via a data network such as a TCP/IP local area network. The OMC 20 includes a system processor 40, a user station 22, a multi-user station 24, a display terminal 26, and a computer network interconnection system 28. The computer network interconnection system 28 is typically a standard computer data network such as a TCP/IP ethernet network. Although both a single user station and a multi user server 22 and 24, are shown, these servers are optional.

Figure 2:
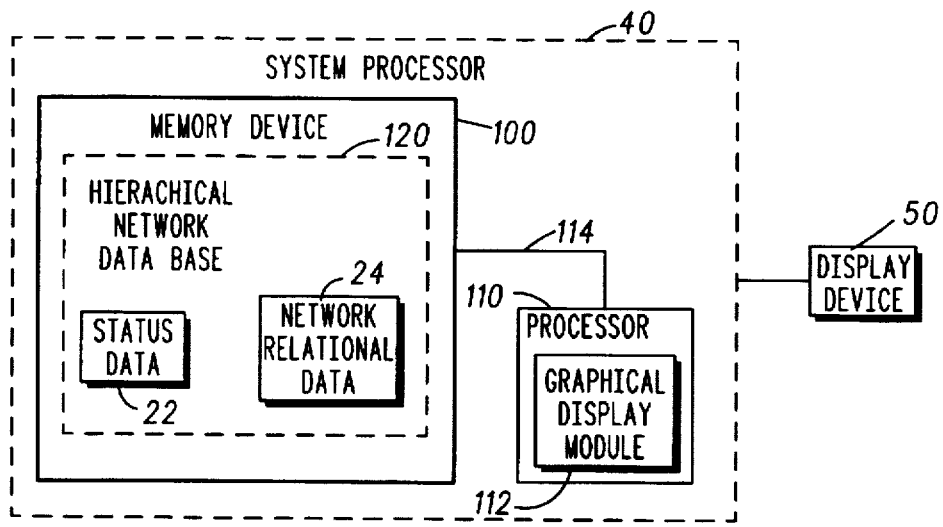
FIG. 2 is a block diagram of the system processor and display device of FIG. 1.

Referring to FIG. 2, a more detailed diagram of the system processor 40 is provided. The system processor 40 includes a memory device 100 and a processor 110. The memory device 100 is coupled to the processor 110 via a bus 114. The memory device 100 includes a hierarchical network database 120 which further includes a status data memory area 122 and a network relationship data area 124. The processor 110 includes a three dimensional graphical display module 112.

In the preferred embodiment, the display module 112 includes hardware and software necessary to present the hierarchical data to the graphical display. Examples of suitable software for the display modules 112 include three dimension rending software available from Alias/Wavefront, Virtual reality modeling language (VRML), and HTML/JAVA®. JAVA® is a registered trademark of Sun Microsystems, Inc. Each of these software packages are known to those of ordinary skill in the art. Suitable hardware includes a high speed graphics monitor capable of quick three dimensional rendering which are known to those skill in the art.

The system processor 40 is connected to a display device 50 in a conventional manner. The display device 50 may be used as the display 26 within the OMC 20 or may be incorporated or attached to the operation support system 32. In any event, the display device 50 is used by operations personnel such as technicians, to control and maintain the communication system 10.

The hierarchical network data base 120, including both the status data area 122 and the network relationship data area 124, contains specific information regarding each of the components within the communication system 10. For example, many components within the base stations 16 such as transceivers, may each have an entry within the hierarchical data base 120. In addition, since each component in the communication system 10 is typically connected to one or more other components, the relationship between components is stored in the network relationship data area 124. For example, since BTS 16 is coupled to CBSC 14 a network relationship between the BTS 16 and CBSC 14 would be stored in the network relationship data area 124. In this manner data regarding each component in the system 10 as well as the relationship between components in a hierarchical model may be stored within the hierarchical network data base 120.

Figure 6:
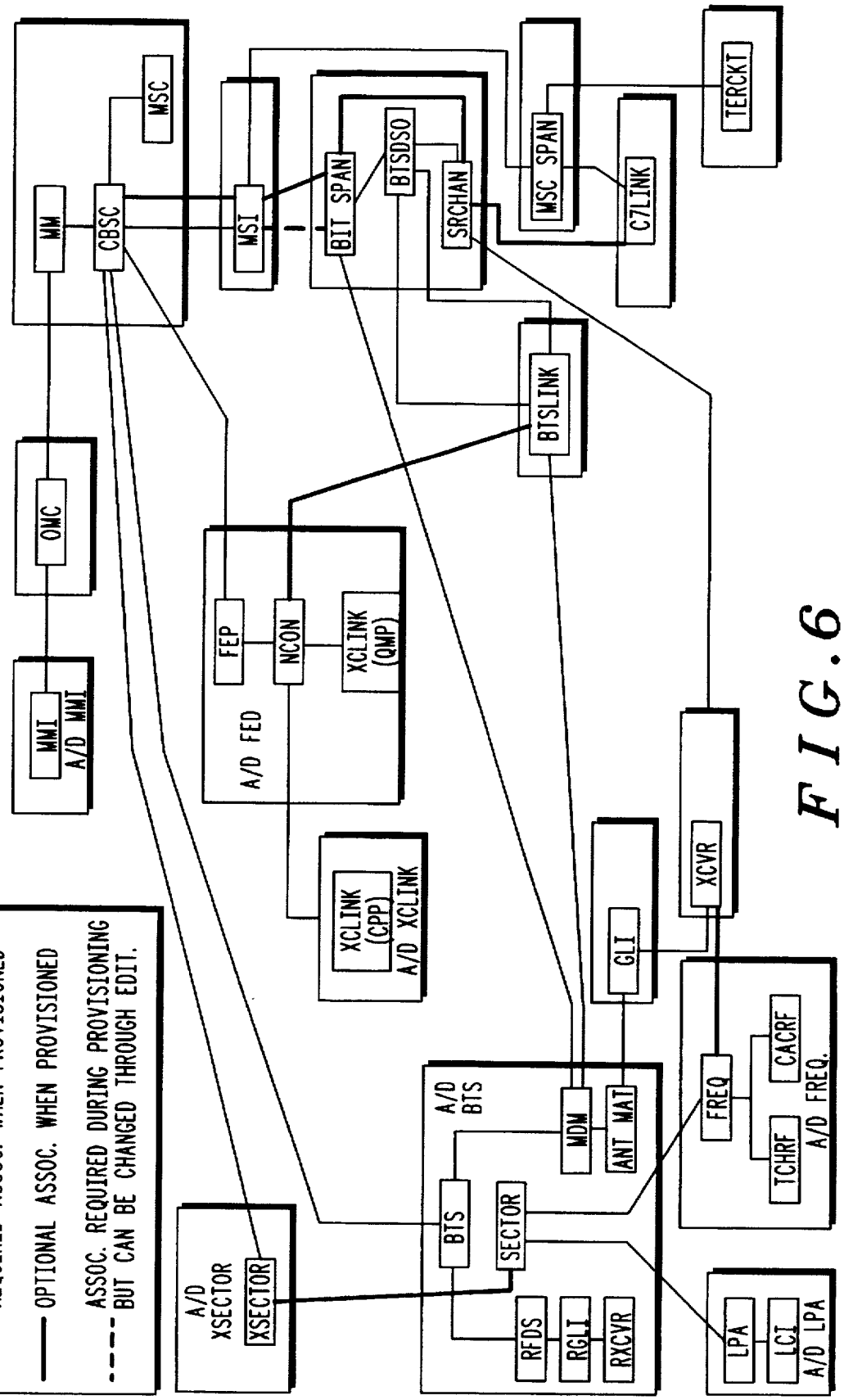
FIG. 6 is a diagram of a hierarchical network that may be displayed by the object of FIGS. 3 and 4.

Referring to FIG. 6, an example of a hierarchical network that may be implemented with a suitable database that stores the network. Many such databases are known to those of ordinary skill in the art. For illustrative purposes, an example of a database record for one element of information for one device in such a database is shown in FIG. 5. The particular database record of FIG. 5 describes the telephony status for a particular device in a cellular system.

Figure 3:
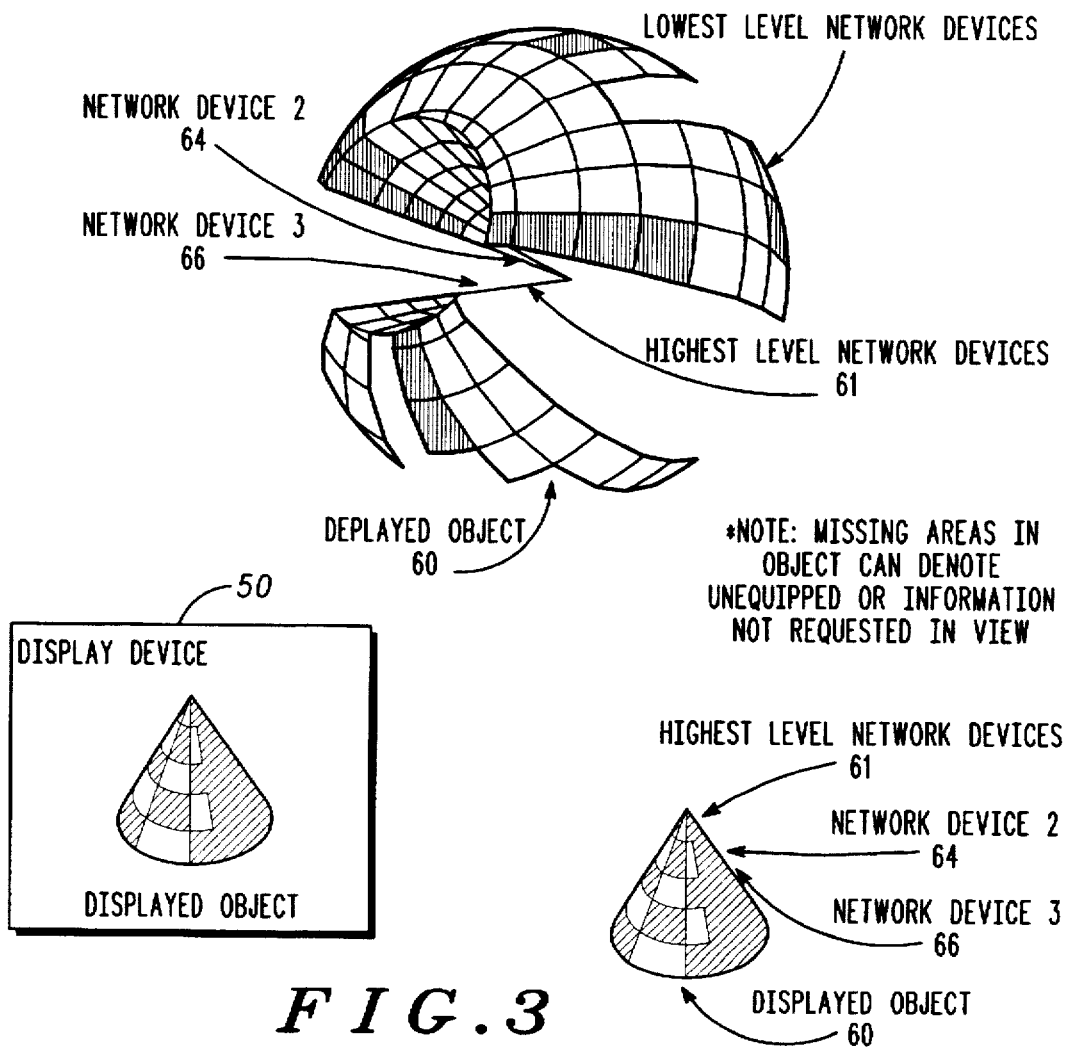

Referring to FIG. 3, an example of an object shown on display device 50 via a three dimensional perspective view is illustrated. The display device 50 shows a displayed object 60 which preferably has a three dimensional shape. A plurality of network devices 62, 64, 66 are each represented by different regions on the surface of the displayed object 60. In addition, relationships between network devices may be shown on the displayed object 60, such as by having higher level network devices 61 displayed on an inner region of the displayed object 60. Although the displayed object 60 is shown to be stationary, it is contemplated that the displayed object may be rotated in any direction by command of an operator such that the operator may view the entire surface of the displayed object 60. In this manner, a greater number of network devices and their associated relationships with other network devices may be quickly seen at a high level. In addition to showing each network device, information associated with each network device may be displayed on the surface of the displayed object 60. For example, a status indicator of each network device may be shown via a different color on the surface region for each respective network device. For example, an out of service network device may be shown in red, an in service device may be shown in blue, and a device that has not been provisioned may be shown in green. Another method of displaying information regarding each network device would be to use a flashing indicator to display alarm conditions.

Referring to FIG. 4, a particular exemplary displayed object for a cellular communication system is illustrated. The displayed object 60 has a spherical shape, only a cross sectional slice of the sphere is shown in FIG. 4, and includes a plurality of network devices, which in this particular case are transceivers, on the outside surface of the object 60. On the inner surface, which is conical in this particular example, a plurality of higher level hierarchical related network devices associated with the transceivers at the surface are shown. For example, in the cellular communication system, the OMC 20 is a high level network device and is positioned in the core of the conical area 62. Other network devices in the system 10 are positioned above OMC 20 in a concentric fashion. For example, other network devices include mobility managers labeled MM, transcoders labeled XC, which are typically found within CBSC 14, a front end processor (FEP), a multiple span line interface processor (MSIP), a BTS link, such as the link between BTS 16 and CBSC 14, and a master group line interface (MGLI).

All of the transceivers which would be found in a particular BTS 16 are preferably arranged in a vertical segment that extends along a longitudinal line over the surface of the displayed object 60. In this manner, an operator may immediately know which transceivers are associated with a particular BTS 16. Where the displayed device 50 is a conventional resolution display, such as a CRT, it is contemplated that up to 750 transceivers may be illustrated. However, it is preferred to use a high resolution display, such as a 1280 by 1024 pixel display, so that several thousand transceivers may be viewed. In addition to the display of status information, the display system allows an operator to select one or more of the displayed network target devices, such as a particular transceiver, by clicking on the surface area associated with that transceiver, such as by using a computer mouse. After a specific target network device has been selected, many data base type operations may be performed, such as adding a new device, editing parameters on the device, activating a device, or deleting a particular device. The necessary parameters for the selected device may be provided either through keyboard data entry or through selection via a mouse.

To provide the user with further comprehension of the system, a plurality of hot link accesses from a particular network device to related information of the particular device, such as a detailed diagram or photograph of the device, may be provided. The detailed diagram or photograph may be supplemented by exploded diagrams of the device and how that device interconnects as well as a textual explanation of the purpose and capacity of each such device. Another feature provided by the display, is that a database query may be made of the system to show all network devices that possess certain qualities. For example, all devices that satisfy a particular query, such as all active devices on a particular base station 16 or connected to a particular CBSC 14, may appear in a designated color. This feature may be particularly useful in detecting defects in a network device such as a transceiver, before it fails completely. Another anticipated feature of the display device 50 and the system processor 40, is that requested additions or deletions made by the operator may be synthesized into a parts list such as an order form for new equipment. By using the display device 50 and operator commands to form a price list, rapid quotes may be made available to the customer. Although many display devices may be used, it is preferred that the device should be suited to three dimensional monitoring. An example of a suitable display device is a high speed graphics workstation, such as those made by Silicon Graphics, Inc.

Although FIG. 4 refers to the network devices of communication system 10 which is a cellular communication system, the present invention is applicable to many noncellular applications. For example, other communication network such as telephone networks, data networks or satellite networks may advantageously use the method and apparatus discussed above. In addition other systems such as utilities, transportation networks and assembly line or manufacturing environments could make use of displays such as those described herein.

The illustrative method and apparatus described herein have many advantages. For example, the apparatus provides the ability for a technical operator to quickly observe and monitor the status of any one of many, components, such as transceivers and associated elements in a complex system. Consequently, the operator may more quickly detect and react to trouble spots in the system. In addition, system operators may more quickly gain familiarity with the system due to the three dimensional user friendly presentation of system components.

Further advantages and modifications of the above described apparatus and method will readily occur to those skilled in the art. The invention, in its broader aspects, is therefore not limited to the specific details, representative apparatus, and illustrative examples shown and described above. Various modifications and variations can be made to the above specification without departing from the scope or spirit of the present invention, and it is intended that the present invention cover all such modifications and variations provided they come within the scope of the following claims and their equivalents.

What is claimed is:

1. A method of displaying hierarchical data comprising the steps of:

retrieving hierarchical network data representative of a status of a network, said data including a plurality of data elements, each data element associated with a network device; and displaying the hierarchical network data onto a surface of a three dimensional structure, displayed on a two-dimensional display for the purpose of controlling the network based on the display.

2. The method of claim 1, wherein said structure comprises a conical object.

3. The method of claim 1, wherein said structure is selected from the group consisting essentially of spherical objects and concentric circular objects.

4. The method of claim 1, wherein said structure changes position over a period of time.

5. The method of claim 4, wherein said structure changes position in a tumbling pattern over said period of time.

6. The method of claim 1, wherein said surface has a plurality of display regions, at least some of said display regions representing at least some of the data elements.

7. The method of claim 6, wherein at least one of said plurality of display regions is uniquely selectable.

8. The method of claim 7, wherein further information is associated with the network device linked to the data element represented by said at least one display region when said at least one display region is selected.

9. An apparatus for displaying hierarchical data comprising:

a display device;

a memory device storing the hierarchical data representative of a status of a network, said hierarchical data including a plurality of data elements, each data element associated with a network device; and a processor responsive to said memory and including a graphical display module that displays the hierarchical network data onto a surface of a three dimensional structure, displayed on a two-dimensional display device, for the purpose of controlling the network based on the display.

10. The apparatus of claim 9, wherein said network device comprises a communication system network device.

11. The apparatus of claim 9, wherein said structure comprises one of a conical object and a spherical object.

12. The apparatus of claim 9, wherein said structure position on the display device over a period of time.

13. The apparatus of claim 9, wherein said surface has a plurality of display regions, at least some of said display regions representing at least some of the data elements.

14. The apparatus of claim 13, further comprising a pointing device in communication with said display device, and wherein at least one of said plurality of display regions is uniquely selectable by said pointing device.

15. The apparatus of claims 9, wherein said memory device comprises a first memory area storing status data associated with each network device and a second memory area storing network device relationship data defining a relationship between the data elements.

* * * * *